W. R. BLAIR.

THREAD TAKE-UP FOR SEWING MACHINES.

APPLICATION FILED JAN. 15, 1912.

Reissued Mar. 12, 1912. 13,381.

WITNESSES

Wm. Jannus

J. A. Bishop

INVENTOR

WM. R. BLAIR

BY J. N. Cornwell, ATT'Y.

COLUMBIA PLANOGRAPH CO., WASHINGTON, D. C.

UNITED STATES PATENT OFFICE.

WILLIAM R. BLAIR, OF ST. LOUIS, MISSOURI, ASSIGNOR TO LANDIS MACHINE COMPANY, OF ST. LOUIS, MISSOURI, A CORPORATION OF MISSOURI.

THREAD TAKE-UP FOR SEWING-MACHINES.

13,381. Specification of Reissued Letters Patent. Reissued Mar. 12, 1912.

Original No. 978,832, dated December 20, 1910. Serial No. 568,732. Application for reissue filed January 15, 1912. Serial No. 671,393.

*To all whom it may concern:*

Be it known that I, WILLIAM R. BLAIR, a citizen of the United States, residing at St. Louis, Missouri, have invented a certain new and useful Improvement in Thread Take-Ups for Sewing-Machines, of which the following is a full, clear, and exact description, such as will enable others skilled in the art to which it appertains to make and use the same, reference being had to the accompanying drawings, forming part of this specification, in which—

Figure 1:
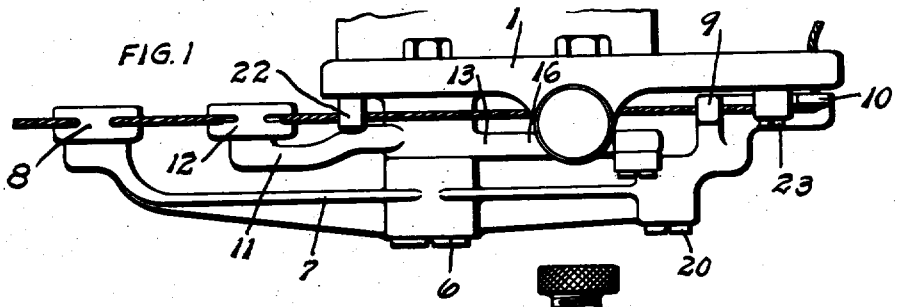
Figure 2:
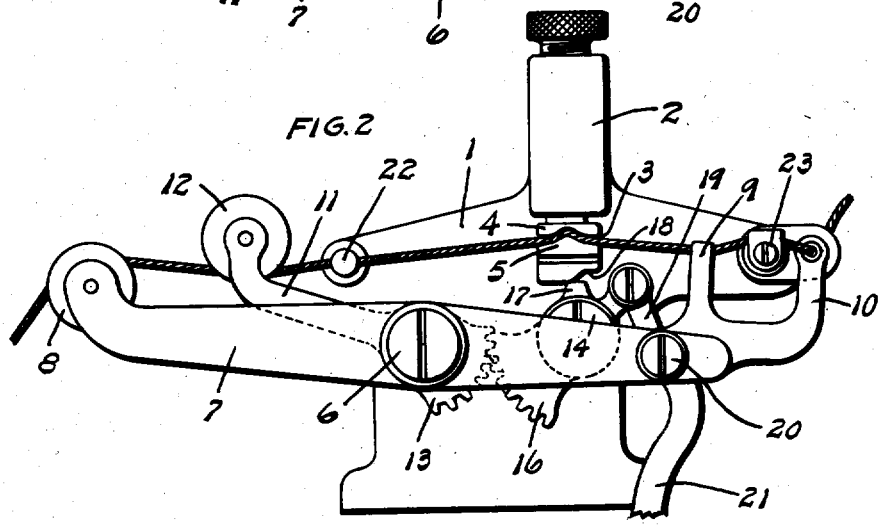
Figure 3:
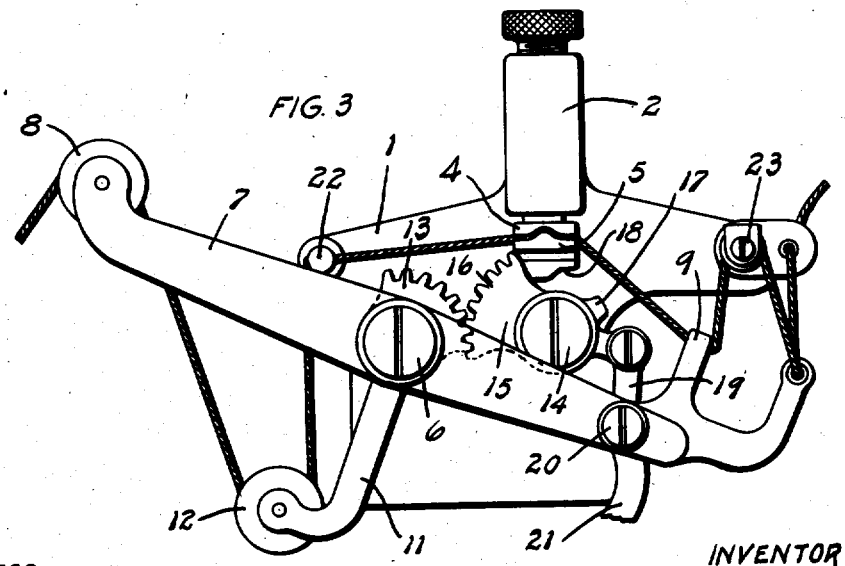

Figure 1 is a plan view of my improved take-up. Fig. 2 is a side elevational view. Fig. 3 is an elevational view similar to Fig. 2, but showing the parts of the device in another position.

This invention relates to a new and useful improved form of take-up device, and is particularly adapted to be used in connection with wax thread sewing machines of the well known type, and illustrated in the patent to Campbell No. 374,936, December 20, 1887.

My improved device consists of two cooperating arms to perform the take-up action, and a thread clamping device all of which are operated from the same means.

My invention consists in the details of this operating means as will be pointed out in the accompanying claims.

In the accompanying drawings 1 indicates a bracket to be mounted on the over hanging arm of the ordinary wax thread type of sewing machines. On this bracket is a recessed boss within which is mounted the thread clamping device 3 consisting of two jaws 4 and 5, which are operated to clamp the thread therebetween. This tension or clamp is more fully described in U. S. Letters Patent No. 982,234, dated Jan. 24, 1911. On a stud 6 is pivotally mounted the thread lever 7 having a thread engaging roll 8 at one end and thread engaging arms 9 and 10 at the other. Pivoted on this same stud 6 is the take-up lever 11 with thread roll 12 at one end, and a segmental gear 13 at the opposite end. On an adjacent stud 14 is mounted a combined segmental gear and cam 15 having teeth 16 which intermesh with the teeth on the gear 13. On one side of this device 15 is mounted a cam lug 17 which co-acts with a cam surface 18 on the lower end of the jaw 4 in order that in the movement of the part 17 the jaw 4 may be raised from its contact with the jaw 5. The member 15 is connected by means of a link 19 to a pivot stud 20 on the thread lever 7. Connected with this same stud 20 is an operating link 21 operatively connected to the main shaft of the machine in the well known manner. The thread comes from the wax pot and passes through an eye in the bracket 1, whence it leads through an eye in the arm 10 and thence passes over the guide roll 23. The thread then passes through an eye in the arm 9, between the clamping jaws 4 and 5 through the fixed eye 22 on the bracket 1, under the roll 12 and over the roll 8 to the stitch forming mechanism.

The operation of my device is clear from the showing in Figs. 2 and 3. As the link 21 is moved down by the operating means, the opposite end of the thread lever 7 is moved up, and the lever 11 is moved down through the segmental gearing 13 and 16, and link connection 19 to the stud 20. Simultaneously the cam lug 17 is removed from the cam surface 18 on the jaw 4 to allow the said jaw to be moved down by spring pressure to clamp the thread between the jaws 4 and 5. Also at this time the arms 9 and 10 are moved down on either side of the guide roll 23 to draw the thread through the wax pot.

The essential features of my invention are the mounting of the thread, and take-up levers on the same pivot stud, and also having a set of segmental gears to actuate the take-up lever.

I am aware that minor changes in the construction, arrangement and combination of the various parts of my improved device can be made and substituted for those herein shown and described without departing from the nature and spirit of my invention, the scope of which is indicated in the accompanying claims.

I claim:

1. A take-up device, comprising a thread clamp, a lever with a thread engaging part at each end, means for operating the same, an auxiliary lever, and means connecting the two levers, whereby the auxiliary lever is operated in conjunction with the first lever, and having a portion adapted to operate the thread clamp.

2. A take-up device, comprising a pivoted lever, a second lever mounted on the same pivot as the first lever, and a gear connection between the two levers, whereby both levers may be actuated from the same means.

3. A take-up device comprising a lever with a thread engaging part, a second lever with a thread engaging part having a segmental gear attached, an independently mounted gear meshing with said segmental gear, and a link connecting the latter gear with the first mentioned lever.

In testimony whereof I hereunto affix my signature, in the presence of two witnesses, this 11th day of January, 1912.

WILLIAM R. BLAIR.

Witnesses:
F. R. CORNWALL,
M. P. SMITH.

Copies of this patent may be obtained for five cents each, by addressing the "Commissioner of Patents, Washington, D. C."